United States Patent [19]
Kennington

[11] Patent Number: 5,507,851
[45] Date of Patent: Apr. 16, 1996

[54] FILTER CLEANING APPARATUS

[76] Inventor: H. L. Kennington, 5806 Caryridge Dr., Charlotte, N.C. 28277

[21] Appl. No.: 275,504

[22] Filed: Jul. 15, 1994

[51] Int. Cl.$^6$ .................................................. B01D 24/46
[52] U.S. Cl. ................................ 55/273; 55/284; 55/288; 55/294
[58] Field of Search ........................... 55/273, 284, 288, 55/294

[56] References Cited

U.S. PATENT DOCUMENTS

| | | | |
|---|---|---|---|
| 3,166,391 | 1/1965 | Keser | 55/273 |
| 3,606,735 | 9/1971 | Baigas, Jr. | 55/273 |
| 4,204,846 | 5/1980 | Brenholt | 55/288 |
| 4,222,754 | 9/1980 | Horvat | 55/284 |
| 4,359,330 | 11/1982 | Copley | 55/273 |
| 4,439,218 | 3/1984 | Priepke et al. | 55/288 |
| 4,904,282 | 2/1990 | Stuble et al. | 55/273 |
| 5,156,660 | 10/1992 | Wilson | 55/294 |

Primary Examiner—Timothy M. McMahon
Attorney, Agent, or Firm—Clifton Ted Hunt

[57] ABSTRACT

The invention is an apparatus for cleaning accumulations of dust and waste matter from filter media in industrial installations. The dust and waste matter is removed from the filter media with nozzles that move across the filter media in reciprocatory paths. The apparatus of this invention moves the nozzles in a continuous motion during normal operation without having to successivley stop and reverse at the end each path as in the prior art filter cleaning devices.

11 Claims, 7 Drawing Sheets

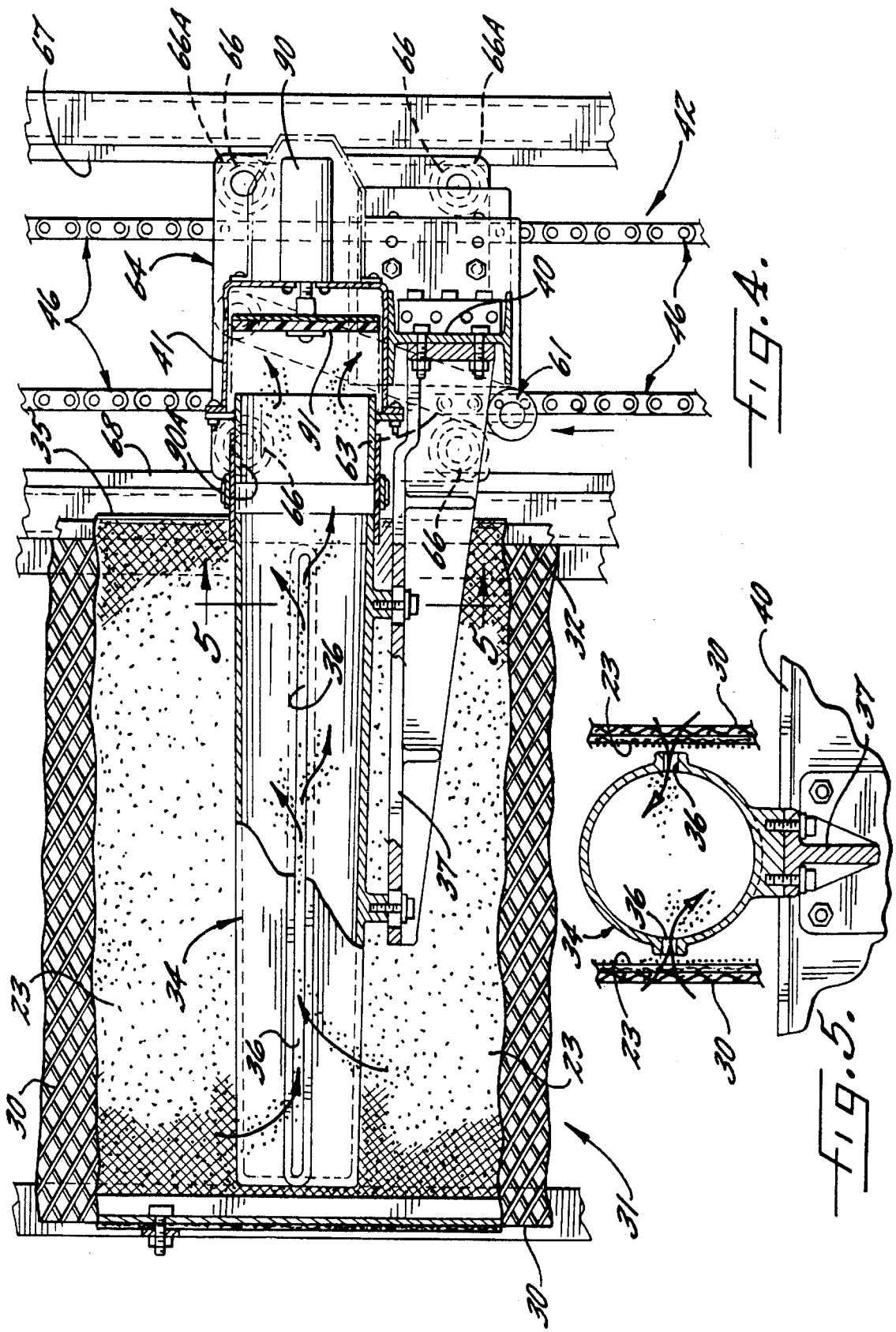

5,507,851

FILTER CLEANING APPARATUS

FIELD OF THE INVENTION

This invention relates to the cleaning of air filters in air handling systems for industrial use, including textiles, furniture factories, leather industries, and others.

BACKGROUND OF THE INVENTION AND STATEMENT OF PRIOR ART

The air filters with which this invention is concerned comprise foraminated filter media arranged in each of a plurality of V-cells in a Vee-Cell module. The individual V-cells are defined by expanded metal with the filter media releasably attached to the interior of the expanded metal in each individual V-cell. The Vee-Cell module extends across a large exhaust conduit in an air handling system to collect airborne waste material generated by a manufacturing facility. The use of Vee-Cell modules is widely used in the textile industry, and others.

The cleaning of the filter media in the V-cells is important to the efficient operation of the air handling system. Several attempts have been made to provide apparatus for effectively cleaning the filter media. For example, U.S. Pat. No. 3,166,391, issued Jan. 19, 1965 to Keser for FILTER CLEANING DEVICE FOR AIR EXHAUST SYSTEMS AND THE LIKE, discloses an apparatus that blows compressed air against the downstream side of filter media in V-cells and collects waste blown from the media in collection tubes on the upstream side of the filter media. The compressed air is delivered to the downstream side of the filter media through pipes that are moved in a reciprocating path across the filter media by a reversible motor. The pipes are moved to the top of the V-cells and stopped while the motor reverses itself to lower the pipes to the bottom of the V-cells.

Pneumafil Corporation makes an apparatus for cleaning the filter media in parallel panels. The Pneumafil apparatus uses a reversible motor to power an indexing mechanism that directs nozzles up and down and in and out of the filter media on parallel panels to direct a negative pressure or vacuum against the upstream side of the filter media. The reversible motor stops, of course, each time it changes direction.

Bahnson Parks Cramer makes an apparatus for cleaning the filter media in Vee-Cell modules. Again, the apparatus is powered by a reversible motor that stops and starts as it reciprocates the apparatus across the surface of the filter media to direct a vacuum against the upstream side of the filter media.

In all of the prior art devices known to applicant for cleaning the filter media in Vee-Cell modules, the apparatus that moves the air nozzles across the filter media is powered by a reversible motor. The motor is operatively connected to the nozzles and moves the nozzles in one direction from a first position to a second position, where the motor stops momentarily as it shifts into the reverse mode. The motor then restarts and moves the nozzles in the opposite direction across the filter media to return the nozzles to the first position.

In most installations, the working environment creates so much dust and airborne waste that it is necessary to continuously clean the filter media during normal operation. The repetitive stopping and starting of the power source interrupts the cleaning cycle and contributes to equipment failure and undesirable interruption of service with a consequent decrease in product quality.

SUMMARY OF THE INVENTION

Applicant has overcome the difficulties of the prior art filter cleaning systems with an apparatus that provides a continuous motion to the air nozzles during normal operation. The motor does not have to stop and reverse as do the motors used in the prior art filter cleaning devices for Vee-Cell modules.

Applicant's apparatus for continuously moving air nozzles across the filter media in a Vee-Cell module comprises a manifold carriage connected to the nozzles and connected to cars that roll along vertically extending horizontally spaced tracks at each end of the manifold carriage. Chains extend around sprockets located at the top and bottom of the Vee-Cell module and at the ends of the manifold carriage. Pivot arms attach the chains to the cars and the pivot arms encircle the sprockets and enable a continuous up and down movement of the cars along the tracks and of the nozzles across the filter media without stopping and reversing the motor. Because the manifold carriage and the nozzles move with the cars in a continuous motion, the filter media is continuously cleaned without interruption during normal operation of the filter cleaning apparatus.

BRIEF DESCRIPTION OF THE DRAWINGS

FIG. 4 is a sectional view with parts broken away and partially in elevation, taken substantially along the line 4—4 in FIG. 3;

FIG. 5 is a sectional view taken substantially along the line 5—5 in FIG. 4;

DETAILED DESCRIPTION OF THE INVENTION

The Environment of The Filter Cleaning Apparatus

Figure 1:
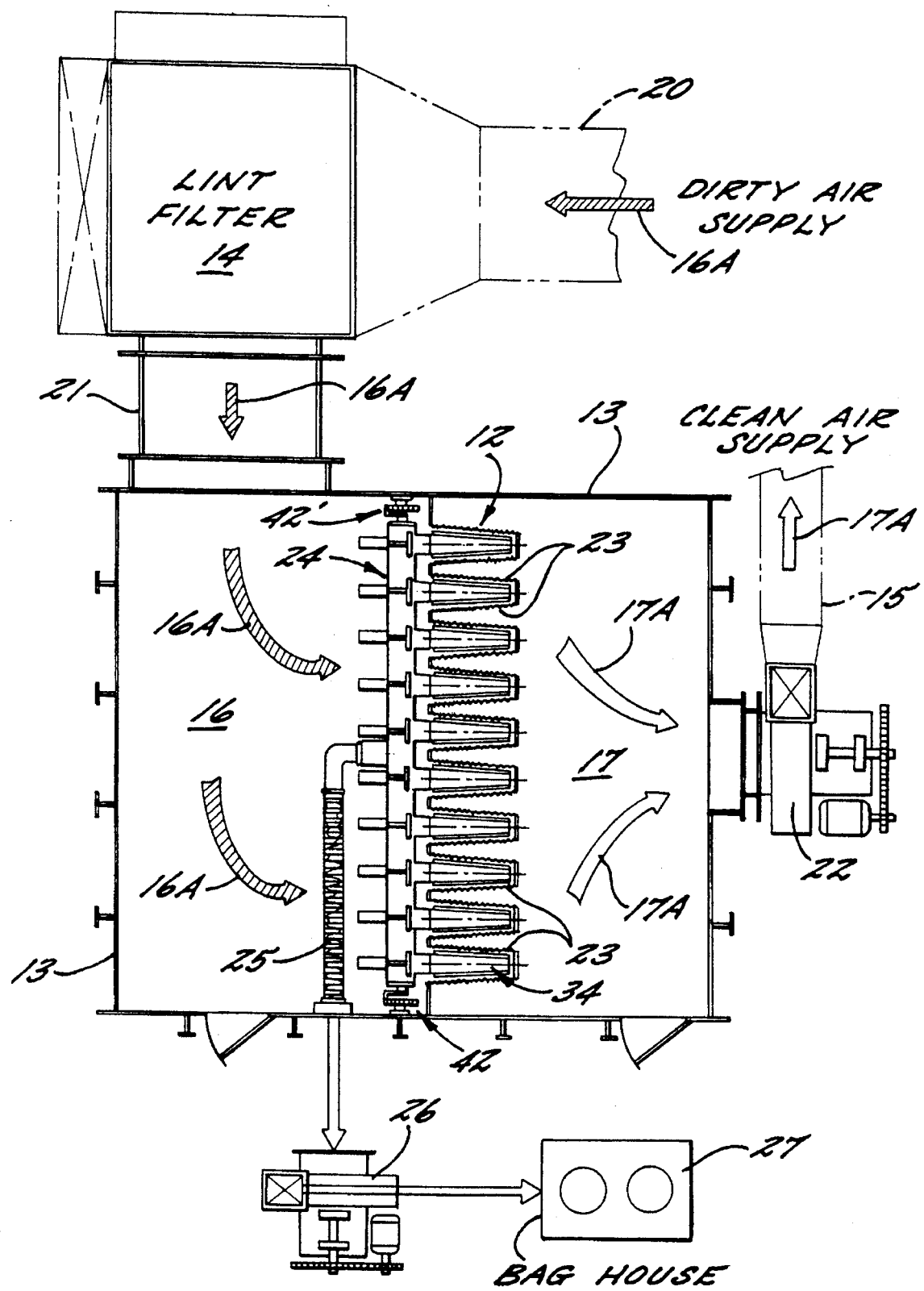
FIG. 1 is a somewhat schematic environmental view of the filter cleaning apparatus and associated equipment.

FIG. 1 shows a Vee-Cell module broadly indicated at 12. The Vee-Cell module extends across an exhaust chamber 13 provided between a lint filter 14 and a clean air supply duct 15. The Vee-Cell module 12 separates a dirty air section 16 from a clean air section 17 of the exhaust chamber 13.

The function of the exhaust chamber and its associated equipment is to remove waste matter and dust from dirty air exhausted from an enclosed manufacturing area, not shown, and return the cleaned air to the manufacturing area. The dirty air with its airborne waste matter and dust is indicated at 16A in FIGS. 1 and 3.

Dirty air 16A is delivered through a duct 20 from the manufacturing area to the lint filter 14. The lint filter 14 removes larger particles of waste matter from the dirty air 16A and expels the remaining waste particles and dust 16A through a duct 21 into the dirty air section 16 of the exhaust chamber 13. A primary fan 22 draws dirty air 16A from the dirty air section 16 through filter media 23 on the Vee-Cell module 12 into the clean air section 17 of the exhaust chamber 13. The filter media 23 cleans the air by capturing the waste material and dust 16A remaining in the dirty air and the cleaned air 17A passes into the clean air section 17 of the exhaust chamber 13. The primary fan 22 returns clean air 17A to the manufacturing area through the duct 15.

Figure 2:
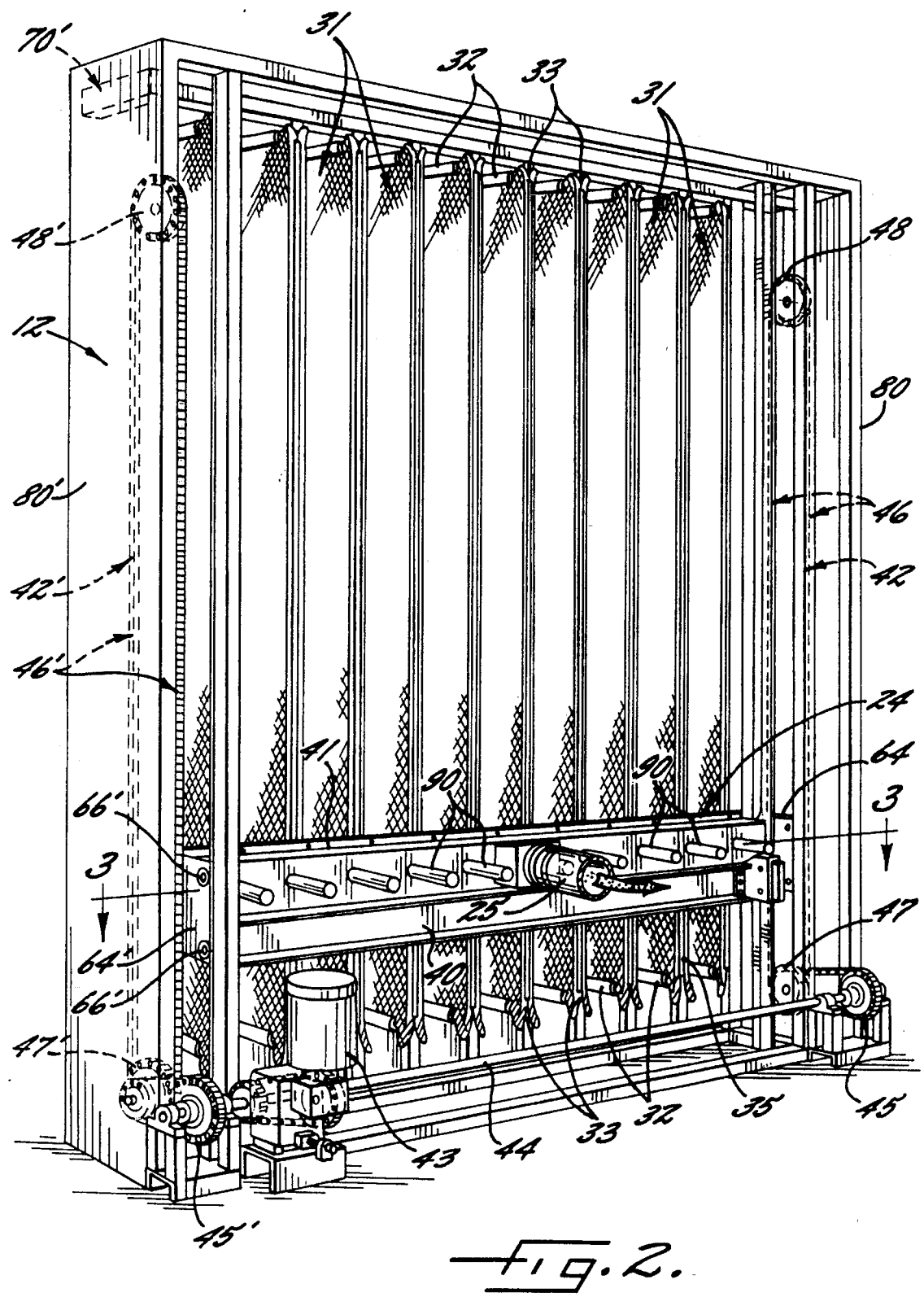
FIG. 2 is a perspective view looking at the front of a Vee-Cell module and showing the manifold carriage, with its cover removed, extending across the module.
Figure 3:
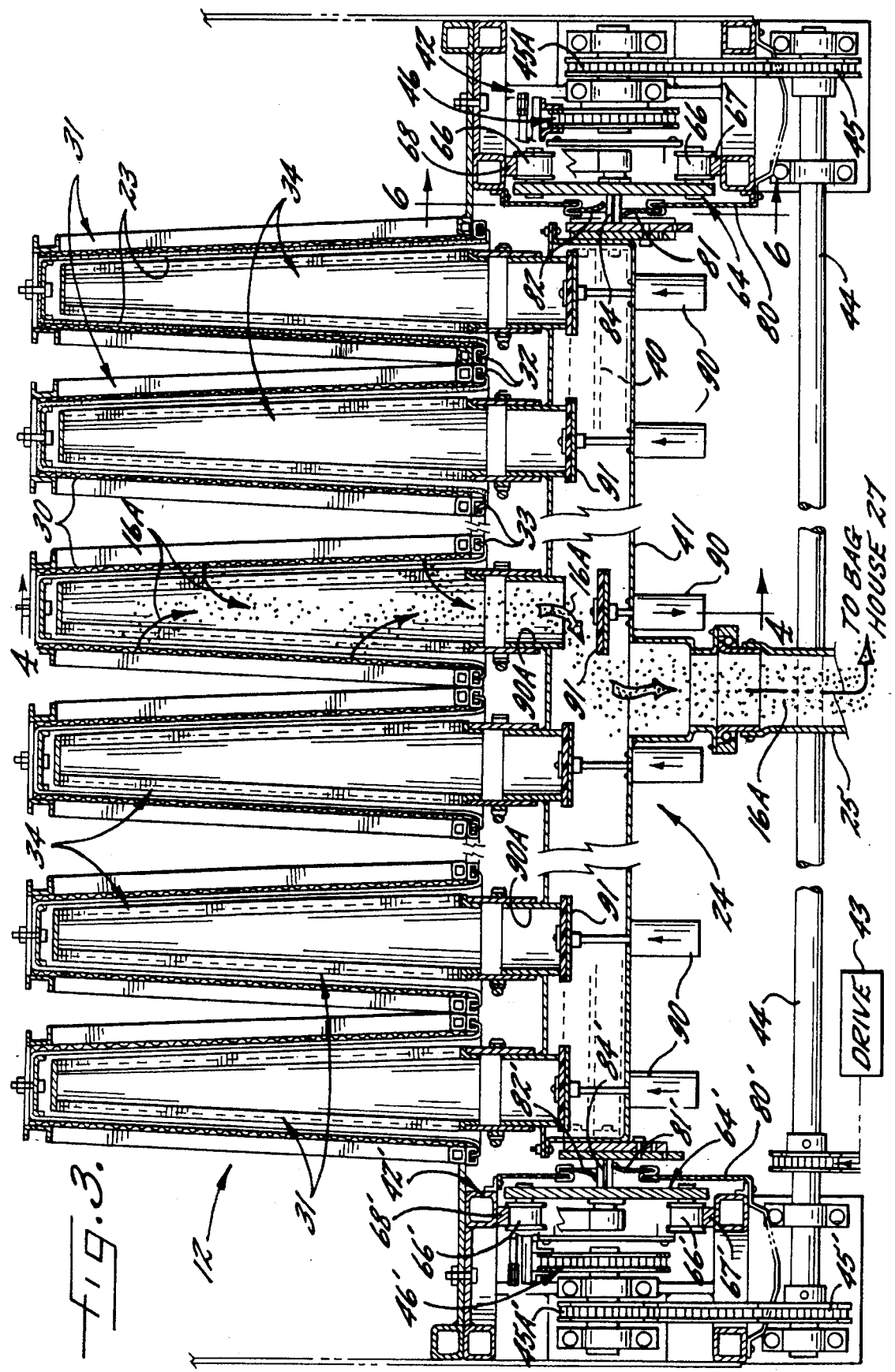
FIG. 3 is a sectional view taken substantially along the line 3—3 in FIG. 2.

Filter cleaning apparatus, generally indicated at 24 in FIGS. 2 and 3, is installed in the dirty air section 16 of the exhaust chamber 13 to remove accumulations of waste matter and dust 16A from the filter media 23. Waste matter and dust 16A that is removed from the filter media by the filter cleaning apparatus 24 is drawn through an exhaust duct 25 (FIGS. 1 and 3) by a high suction stripper fan 26 and delivered to a bag house 27 (FIG. 1) for disposition.

It is important for effective and efficient operation of the exhaust chamber 13 in returning clean air 17A to the manufacturing area that the filter media 23 be kept free of excessive accumulations of waste matter and dust 16A. For this reason, it is desirable that the filter cleaning apparatus 24 continuously clean the filter media during normal operation.

The Filter Cleaning Apparatus

The filter cleaning apparatus 24 comprises the filter media 23 mounted on an expanded metal or wire mesh backing 30 (FIGS. 4 and 5) shaped to define a plurality of individual V-cells 31 (FIG. 2) in the Vee-Cell module 12, there being ten V-cells 31 in the Vee-Cell module shown in the drawings. Prior art filter cleaning systems typically have less V-cells in a Vee-Cell module because the relative efficiencies of the present apparatus enables effective cleaning of a larger area than can be satisfactorily cleaned by the prior art filter cleaning apparatus known to applicant.

The filter media 23 in the illustrated embodiment is a 50% blend of acrylic and modacrylic woven into a foraminated mat, but any desired filter media can be used within the spirit of the invention. The filter media 23 is cut into panels corresponding to the cross-sectional dimensions of the expanded metal 24 in each V-cell 31. The panels of filter media 23 are removably attached to the expanded metal in each V-cell 31 by tubular plastic clips 32 (FIGS. 2 and 3) having one wall that is split as at 33 (FIG. 3) to receive and frictionally retain the edges of the panels of filter media and expanded metal in each V-cell 31.

A nozzle 34 projects inwardly from the rear 35 of each V-cell 31 (FIGS. 3 and 4). Each nozzle has opposed orifices 36 that are spaced a fraction of an inch from the filter media 23 on both sides of the V-cell (FIG. 5). The nozzles are mounted on axially aligned carriages 37 that are, in turn, connected to a transverse beam 40 extending from a manifold carriage 41. The manifold carriage 41 (FIGS. 2 and 3) extends transversely across the rear 35 of the V-cells 31 and is connected at its ends to vertically extending chain hoist mechanisms or chain drives, broadly indicated at 42 and 42¹, at opposite sides of the Vee Cell 12.

The Chain Hoist Mechanism

The chain hoist mechanisms 42 and 42¹ have a common drive, or motor, indicated at 43 in FIGS. 2 and 3. The drive 43 rotates a transversely extending shaft 44 operably connected at its ends to pairs of lower sprockets 45, and 45¹, in the chain drives 42 and 42¹ respectively The lower sprockets 45 and 45¹ are located at the rear of the Vee-Cell 12 (FIG. 2) and are connected to juxtaposed lower sprockets 47 and 47¹, respectively, at the front of the Vee-Cell 12. The sprockets 47, 47¹ are connected by drive chains 46 and 46¹ to upper sprockets 48 and 48¹, respectively, at the top of the Vee-Cell 12.

The motor 43 rotates the shaft 45 in only one direction during normal operation. The chain rotates continuously. It does not reciprocate. In the illustrated embodiment, the shaft 45 is rotated in a clockwise direction to impart corresponding rotation to all of the sprockets through the chains 46 and 46¹.

The drive chains 46 and 46¹ comprise the same elements and operate in the same way. A description of drive chain 46 and its attachments is equally applicable to drive chain 46¹ and and its attachments and like parts in drive chain 46¹ and its attachments bear the same reference number with the prime notation added.

Figure 8:
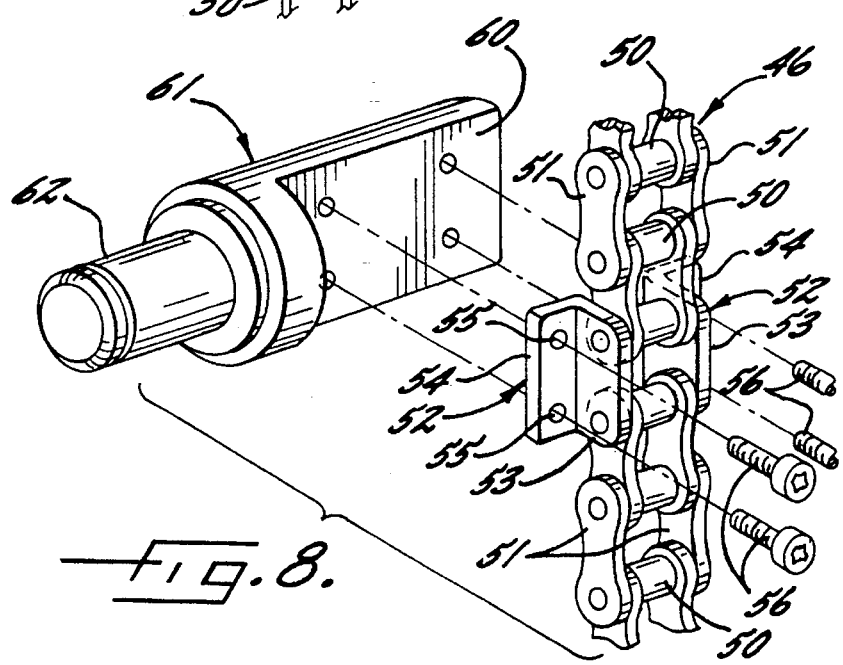
FIG. 8 is an exploded perspective view of the chain and the connector that pivotally connects one end of the pivot arm to the chain.

As shown in FIG. 8, drive chain 46 comprises a plurality of roller links 50 operatively interconnected with connection links 51. L-shaped mounting links 52 that are opposed to each other in use are substituted for opposed connection links 51 at one point on the chain 46. One leg 53 of the L-shaped mounting links 52 functions as the connection links 51 to connect proximal roller links 50. The other leg 54 of the L-shaped mounting links 52 extends laterally from the chain 46 and has openings or throughholes 55 to receive fasteners 56.

Figure 7:
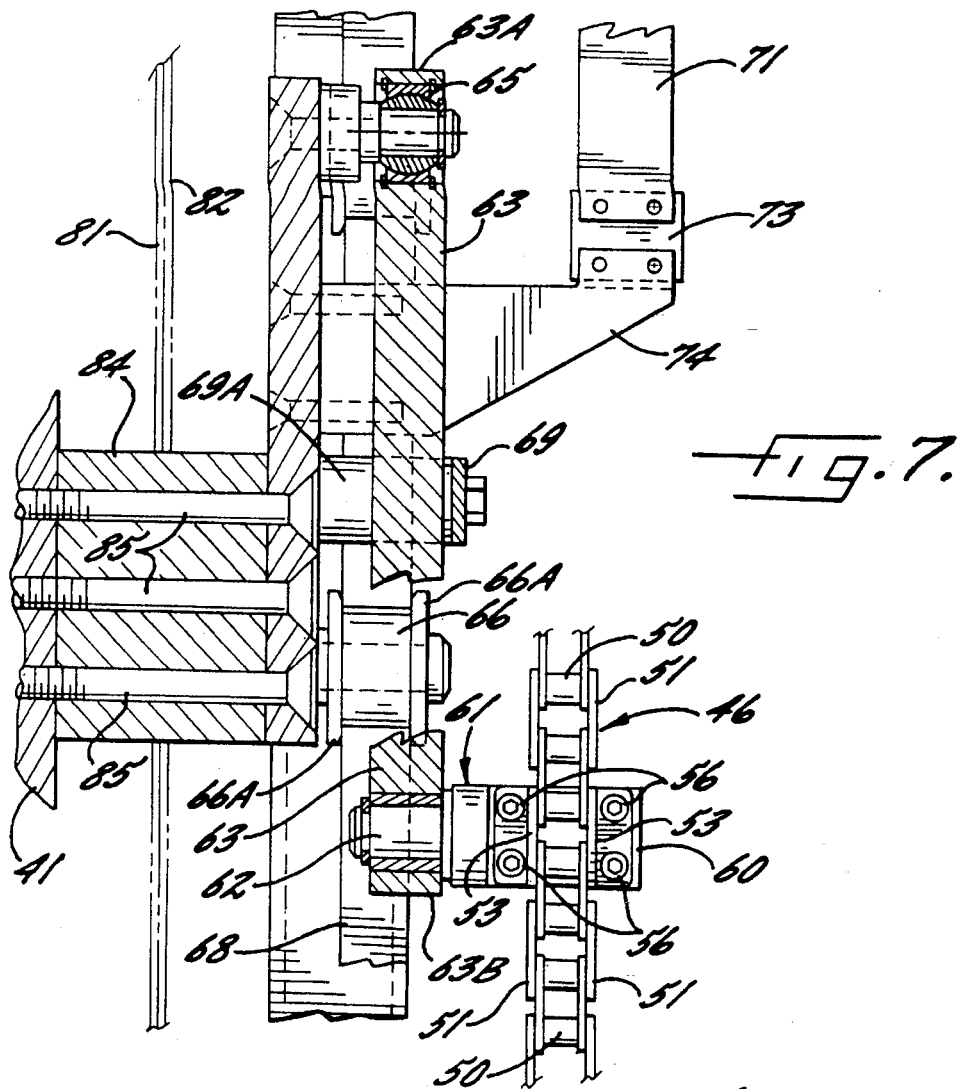
FIG. 7 is a sectional view taken substantially along the line 7—7 in FIG. 6.
Figure 9:
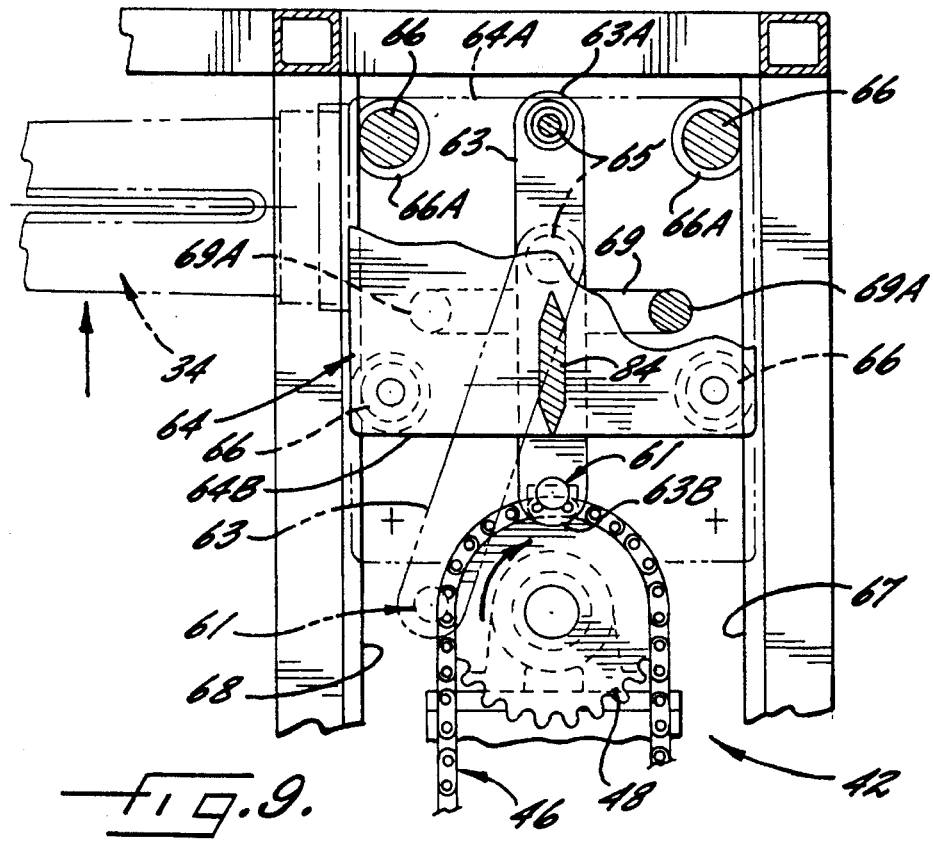
FIG. 9 is a side view, with parts broken away, showing a car and its pivot arm in dotted lines as the car and pivot arm near the top of one of the chain drives, and showing the car and its pivot arm in solid lines as the pivot arm and the car reach the top of the chain drive.
Figure 10:
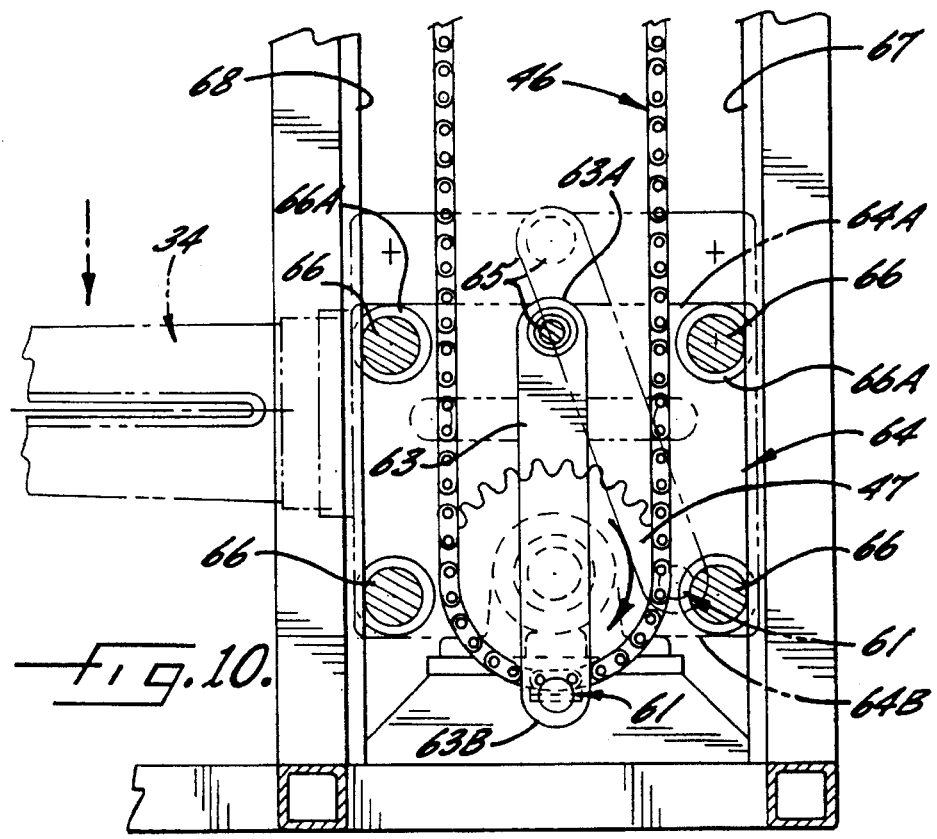
FIG. 10 is a side view of the same car shown in FIG. 3, with parts broken away, showing the car and its pivot arm in dotted lines as the car and pivot arm near the bottom of the chain drive, and showing the car and its pivot arm in solid lines as the pivot arm reaches the bottom of the chain drive.

The fasteners 56 connect the mounting links 52 on chain 46 to a flattened portion 60 of a chain attachment 61. A stub shaft 62 extends from the flattened portion 60 of the chain attachment 61. The stub shaft 62 is journaled for rotation in one end portion 63B of a pivot arm 63 (FIG. 7). The pivot arm extends from the stub shaft 62 on the chain attachment 61 to a car 64 (FIGS. 9 and 10). The car 64 is a rectangular sheet of aluminum with an upper edge 64A and a bottom edge 64B in the drawings. The pivot arm is of a greater length than the distance between the top and bottom edges of the car. The end 63A of the pivot arm 63 is pivotally and rotatably journaled in a bearing or universal joint 65 protruding from the rectangular car 64 at a point equally spaced between the sides of the car 64 and closely spaced from the upper edge 64A of the car 64. As seen in FIGS. 9 and 10, the end 63B of the pivot arm extends beyond the bottom edge 64B of the car 64.

Wheels 66 are at each corner of the car 64 and move the car 64 along vertically extending guide tracks 67 and 68 during normal operation. The cars 64 and 64¹ support approximately 200 pounds while moving the nozzles across the filter media 31 and the cars 64, 64¹ are subjected to considerable bias and pressure as their respective pivot arms orient the cars to move in reciprocatory paths along the tracks. The stress on the cars 64, 64¹ is increased when excessive accumulations of waste material 16A build up on the chains 46, 46¹ and/or the sprockets 47, 47¹ and 48, 48¹. For this reason, each of the wheels 66 includes opposed annular retaining flanges 66A that extend radially from opposite sides of the cylindrical center portion of the wheel. The retaining flanges 66A travel along the sides of respective guide tracks 67, 68 for the purpose of keeping the cars 64, 64¹ on the tracks 67, 68, despite the stress to which the cars are subjected.

The Connection of The Reciprocating Cars to The Continuously Rotating Drive Chains During normal operation, the car 64 continually reciprocates along the tracks 67, 68 between its uppermost point above the top sprocket 48 (FIG. 9) and its lowermost point beside the bottom sprocket 47 (FIG. 10).

FIG. 9 shows the car 64 and pivot arm 63 in dotted lines as the car 64 approaches the top sprocket 48 and shows the car 64 and pivot arm 63 in solid lines as the pivot arm reaches the top of top sprocket 48 during the continuous motion of the chain 46. The chain attachment 61 enables the pivot arm end 63B to move around the top sprocket 48 with the chain 46 as the elongated pivot arm 63 pushes the car to its uppermost position above the sprocket 48. The bearing or universal joint 65 protruding from a point near the center of the upper edge 64A of the car 64 rotates the upper end 63A of the pivot arm 63 while the lower end 63B of the pivot arm is pivoted around the top sprocket 48 by the chain attachment 61. The chain attachment 61 continues to move the pivot arm with the chain downwardly from the top sprocket 48 and the continued downward movement of the pivot arm with the chain pulls the car down the track toward the sprocket 47 at the bottom of the Vee-Cell module.

FIG. 10 shows the car 64 and pivot arm 63 in phantom lines as the car 64 approaches the bottom sprocket 47 and shows the car 64 and pivot arm 63 in solid lines as the end 63B of the pivot arm reaches the bottom of the bottom sprocket 47 during the continuous motion of the chain 46. The chain attachment 61 enables the pivot arm 63 to move around the bottom sprocket as the elongated pivot arm pulls the car 64 down the tracks 67, 68 to the lowermost position of the car, beside the bottom sprocket 47. The additional length of the pivot arm prevents the car from contacting the bottom frame of the Vee-cell module as the chain attachment 61 and the end 63B of the pivot arm 63 move around the bottom of sprocket 47. The pivot arm continues to move with the chain attachment upwardly from the bottom sprocket 47 and push the car up the tracks 67, 68 back to its uppermost position above the top sprocket 48.

The pivot arms 63, 63¹ are subjected to considerable stress as they translate continuous movement of the drive chains 46 and 46¹ into reciprocal movement of the cars 64, 64¹. The stress on the pivot arms sometimes tends to undesirably move the upper portions of the pivot arms away from the cars, endangering the integrity of the bearing or universal joint 65.

Stabilizer bars limit undesirable outward movement of the pivot arms 63, 63¹ away from their respective cars 64, 64¹. The stabilizer bar on car 64 is indicated at 69 and a corresponding stabilizer bar is provided for car 64¹. A description of stabilizer bar 69 will suffice for an understanding of the like stabilizer bar on car 64¹.

Stabilizer bar 69 is a short metal bar that extends across the mid portion of car 64 in substantially parallel relation with upper edge 64A of car 64 and in outwardly spaced relation to the car. The stabilizer bar extends across the pivot arm 63 and sandwiches the pivot arm between the stabilizer bar and the car. The stabilizer ber 69 is supported on bolts and spacers 69A at the ends of the bar. Experience has shown that the stabilizer bars function satisfactorily to hold the pivot arms against undesirable movement.

The Counterweights

In the illustrated embodiment, a spring loaded counterweight or counterbalance device is connected to each of the cars 64, 64¹. The counterbalance device for the car 64 is schematically shown at 70 in FIG. 6. The counterbalance device for the car 64¹ is represented by the dotted box 70¹ in FIG. 2. The counterbalance devices 70 and 70¹ are commercially available. Their structure is not part of this invention, and any desired counterbalance or counterweight can be used with the invention.

The function of the counterbalance devices is to lessen the stress imposed on the chain drive mechanisms 42 and 42¹ by at least partially compensating for the weight carried by the cars 64, 64¹. Toward this end, the counterbalance devices 70 and 70¹ are fastened to the frame of the Vee-Cell module 12 above the top sprockets 48 and 48¹. Tapes or straps 71 and 72 extend downwardly from the counterbalance device 70 and are attached as at 73 to an arm 74 extending laterally from the car 64 in FIGS. 6 and 7. Although not shown, the counterbalance device 70¹ is connected to the car 64¹ in the same manner. The spring assemblies compensate in a known manner for the weight carried by the cars 64, 64¹.

The Housing

The filter cleaning apparatus 24 is located in the dirty air section 16 of the exhaust chamber 13. It is desirable for efficient operation that the chain drives 42 and 42¹ be protected from the dirty air 16A. A metal housing 80 surrounds each of the chain drives 42 and 42¹, except for vertically extending passages that accomodate the connections of the cars 64, 64¹ to opposite ends of the manifold carriage 41.

The vertically extending passages are closed by a pair of overlapping flexible flaps 81 and 82 (FIGS. 6 and 7) extending toward each other from proximal portions of the metal housing 80. The flaps 81 and 82 overlap as at 83 in FIG. 6 and complete the enclosure of the chain drives 42, 42¹.

The Plows

Figure 6:
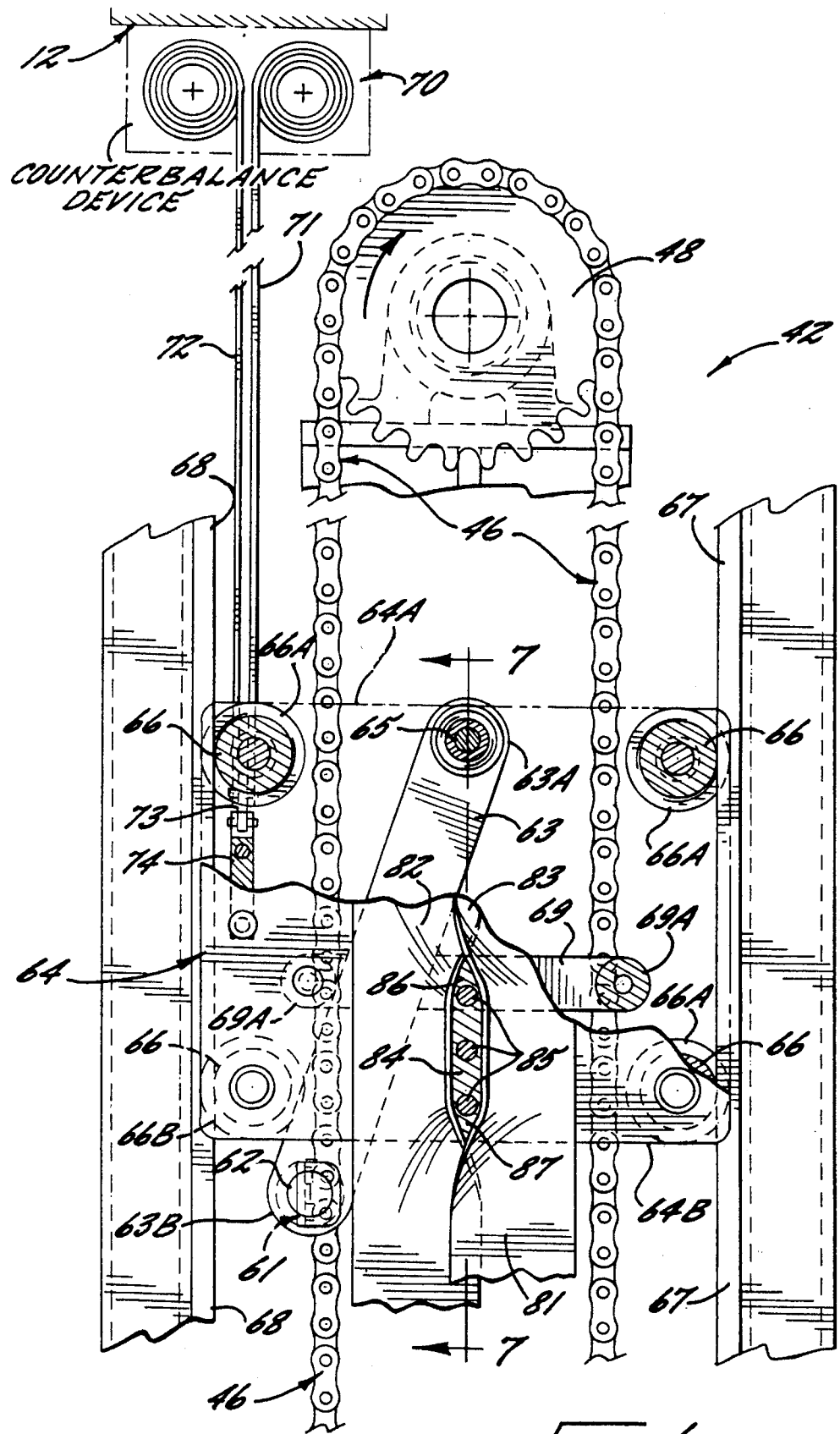
FIG. 6 is a sectional view with parts broken away and partially in elevation, taken substantially along the line 6—6 in FIG. 3.

The cars 64, 64¹ are connected to opposite ends of the carriage 41 which is, of course, outside the housing 80 and in the dirty air section 16 of the exhaust chamber. To minimize exposure of the chain drives 42, 42¹ to the dirty air 16A, double edged plows 84 extend between the overlapping flaps 81, 82 and connect the cars to the manifold carriage. FIGS. 6 and 7 show plow 84 penetrating the overlapping flaps 81, 82 and connecting car 64 to one end of the manifold carriage 41 with three bolts 85. The pointed edges 86 and 87 at the top and bottom of the plow 84 separate the overlapping flaps 81 and 82 only at the point of contact and the flaps return to overlapping engagement right at their juncture with the plow. Exposure of the chain drives to the dirty air is thereby minimized.

A plow 84¹ structurally and functionally corresponds to plow 84. Plow 84¹ extends through overlapping flaps 81¹ and 82¹ to connect car 64¹ to one end of manifold carriage 41.

The Exhaust System

The plows move the manifold carriage 41 with the cars 64 and 64¹, causing the nozzles 34 attached to the manifold carriage to move continuously across the surface of the filter media during normal operation. The manifold carriage 41 is connected to the exhaust duct 25. The casings 90A of poppit valves 90 extend from the manifold carriage 41 in registry with corresponding V-cells 31. Air actuated plungers 91 normally close the valves 90, but the valves 90 are sequentially opened to enable the stripper fan 26 to withdraw an accumulation of waste from one V-cell at a time (FIG. 3).

A photohelic pressure differential switch/gauge with a programmable logic controller (not shown) controls the system. An accumulation of airborne waste on the filter media causes an increase in the pressure drop. When the pressure drop reaches a predetermined point (one to one-and-a-half (1 to 1.5) inch drop in static pressure in the illustrated embodiment), the photohelic pressure differential switch/gauge activates the filter cleaning apparatus. The amount of pressure drop necessary to activate the filter cleaning apparatus varies and, as is well known in the trade, the photohelic pressure differential switch/gauge with a programmable logic controller may be adjusted to activate the filter cleaning apparatus at any desired increase in the pressure drop.

When the filter cleaning apparatus is activated, the chain drives 42 and 42¹ move the cars 64, 64¹ back and forth between the bottom sprockets 47, 47¹ and the top sprockets 48, 48¹ as the chains 42, 42¹ continuously move in the same direction and carry the chain attachment 61 around the sprockets 47 and 48. Movement of the chain attachment 61 around the sprockets 47 and 48 orients the pivot arms 63, 63¹ to move their respective cars 64, 64¹ in a reciprocal path between the top and bottom sprockets.

The manifold carriage 41 and nozzles 34 move in reciprocating paths with the cars 64, 64¹, and the high suction stripper fan 26 and the primary fan 22 are simultaneously activated with the chain drives 42 and 42¹ when the pressure drop reaches the predetermined point.

The plungers 71 in the manifold carriage are sequentially opened to create suction through the nozzles 34 in successive V-cells 31. The suction in the active nozzles removes dirty air, with its airborne waste matter and dust 16A, from the filter media 23 on both sides of its V-cell and the stripper fan 26 draws the dirty air and waste 16A through the manifold carriage and into the duct 25 for delivery to the bag house 27 (FIG. 3).

Summary

The pivot arms 63, 63¹ on the cars 64, 64¹ and the novel connection of the pivot arms to the chains are the key factors in the advance of the present invention over the prior art. The continuous uninterrupted motion of the nozzles across the filter media results in more cleaning with less energy and less down time than has heretofore been possible.

Although specific term have been used in describing the invention, they have been used in a descriptive and generic sense only and not for the purpose of limitation. The scope of the invention is to be determined by reading the following claims to invention in light of the specification and drawings and the applicable prior art.

I claim:

1. Apparatus for cleaning filter media comprising nozzles that travel across one surface of filter media in a reciprocatory path between opposed ends of the filter media to remove accumulations of dust and waste matter from the filter media, said apparatus having a manifold carriage operatively connected to the nozzles, a chain hoist mechanism, the chain hoist mechanism having top and bottom sprockets at each end of the manifold carriage and drive chains extending around the top and bottom sprockets, wherein the improvement comprises means for continuously reciprocating the nozzles between the opposed ends of the filter media without stopping to reverse direction during normal operation, said means comprising:

(a) a car attached to each end of the manifold carriage, (b) a pivot arm for each car, (c) a chain attachment for connecting each pivot car to a drive chain, (d) means connecting the chain attachments to the drive chains, (d) means connecting the chain attachments to first ends of respective pivot arms, and (e) means pivotally connecting second ends of the pivot arms to their respective cars, whereby the chain attachments carry the first ends of the pivot arms around the sprockets while the means pivotally connecting the second ends of the pivot arms to their respective cars rotate the second ends of the pivot arms relative to their respective cars while the first ends of the pivot arms are carried around the sprockets, and whereby the pivot arms move the cars and manifold carriage in reciprocatory paths and the nozzles continuously reciprocate between the opposed ends of the filter media without stopping to reverse direction during normal operation.

2. The invention of claim 1 wherein the chain hoist mechanism includes a pair of guide tracks at each side of the manifold carriage, the cars are of rectangular configuration with a top edge and a bottom edge, and wheels are provided at the corners of the cars for engagement with the guide tracks.

3. The invention of claim 2 wherein the wheels include retaining flanges that travel along the sides of the guide tracks to keep the cars on the tracks during normal operation.

4. The invention of claim 1 wherein the cars are of rectangular configuration with a top edge, side edges and a bottom edge, the second ends of the pivot arms are connected to the cars at points equally spaced from the side edges and closely spaced from the top edge, and the pivot arms extend beyond the bottom edges of the cars.

5. The invention of claim 4 wherein the means pivotally connecting the second ends of the pivot arms to their respective cars comprise universal joints protruding perpendicularly from the rectangular cars at the points equally spaced between the sides of the cars and closely spaced from the upper edges of the cars.

6. The invention of claim 1 wherein the chain attachments comprise flattened portions for attachment to the drive chains and stub shafts extending from the flattened portions for rotatable connections to the first ends of the pivot bars.

7. The invention of claim 6 wherein L-shaped mounting links connect the flattened portions of the chain attachments to the drive chains.

8. The invention of claim 1 wherein metal housings surround the chain hoist mechanisms on both sides of the manifold carriage and overflapping flaps of flexible material extend vertically between the manifold carriage and the cars at the ends of the manifold carriage, a plow at each end of the manifold carriage, means connecting the plows to respective ends of the manifold carriage, each plow extending from the manifold carriage through its respective overlapping flaps of flexible material to its respective car, means connecting the plows to the cars, and the top and bottom edges of each plow being beveled to separate the overlapping flaps of flexible material only at the point of contact, whereby the flaps return to overlapping engagement at their juncture with the plow.

9. Apparatus for cleaning filter media comprising nozzles that travel across one surface of filter media in a reciprocatory path between opposed ends of the filter media to remove accumulations of dust and waste matter from the filter media, said apparatus having a manifold carriage operatively connected to the nozzles, a chain hoist mechanism, the chain hoist mechanism having top and bottom sprockets at each end of the manifold carriage and drive chains extending around the top and bottom sprockets, wherein the improvement comprises means for continuously reciprocating the nozzles between the opposed ends of the filter media without stopping to reverse direction during normal operation, said means comprising:

(a) a car attached to each end of the manifold carriage, (b) a pair of guide tracks at each side of the manifold carriage, (c) wheels on the cars for engagement with the guide tracks,
   (i) the wheels including opposed flanges that extend along the sides of the tracks, (d) a pivot arm for each car, (e) a chain attachment for connecting each pivot car to a drive chain, (f) means connecting the chain attachments to the drive chains, (g) means connecting the chain attachments to first ends of respective pivot arms, and (h) means pivotally connecting second ends of the pivot arms to their respective cars, whereby the chain attachments carry the first ends of the pivot arms around the sprockets while the means pivotally connecting the second ends of the pivot arms to their respective cars rotate the second ends of the pivot arms relative to their respective cars while the first ends of the pivot arms are carried around the sprockets, and whereby the pivot arms move the cars and manifold carriage in reciprocatory paths and the nozzles continuously reciprocate between the opposed ends of the filter media without stopping to reverse direction during normal operation the drive chains.

10. Apparatus for cleaning filter media comprising nozzles that travel across one surface of filter media in a reciprocatory path between opposed ends of the filter media to remove accumulations of dust and waste matter from the filter media, said apparatus further comprising means for continuously reciprocating the nozzles between the opposed ends of the filter media without stopping to reverse direction during normal operation.

11. The invention of claim 10 wherein the invention includes a manifold carriage operatively connected to the nozzles, chain hoist mechanism including drive chains at both ends of the manifold carriage, a car operatively connected to each drive chain, a plow connecting each car to the manifold carriage, a pivot arm for each car, means pivotally and rotatably connecting corresponding ends of the pivot arms to the cars, and means pivotally connecting the other ends of the pivot arms to the drive chains.

* * * * *